United States Patent [19]
Kirchhoff

[11] 3,743,414
[45] July 3, 1973

[54] REPRODUCTION CAMERA WITH VARIABLE IMAGE SCALE

[75] Inventor: Kurt Kirchhoff, Hamburg-Lurup, Germany

[73] Assignee: Jos. Schneider & Co. Optische Werke, Bad Kreuznach, Germany

[22] Filed: Oct. 18, 1971

[21] Appl. No.: 190,224

[30] Foreign Application Priority Data
Oct. 17, 1970 Germany.................. P 20 51 122.2

[52] U.S. Cl....................... 355/52, 95/4.5 J, 355/66
[51] Int. Cl............................................ G03b 27/68
[58] Field of Search.................. 355/52, 18, 63, 65, 355/66; 95/4.5 J

[56] References Cited
UNITED STATES PATENTS

| | | | |
|---|---|---|---|
| 1,932,082 | 10/1933 | Newcomer | 355/52 |
| 3,015,988 | 1/1962 | Hemstreet | 355/52 |
| 3,558,225 | 1/1971 | Kirchhoff | 355/52 |

Primary Examiner—Samuel S. Matthews
Assistant Examiner—Richard A. Wintercorn
Attorney—Karl F. Ross

[57] ABSTRACT

A fixed-focus camera with spherically effective front and rear lens groups has two pairs of prisms inserted between these lens groups, each pair of prisms being adjustable by means of a respective setting ring for varying the image scale either anamorphotically or orthomorphotically. For orthomorphotic variation, the settings rings may be coupled for joint displacement while the optically effective planes of the prism pairs are mutually perpendicular; for maximum anamorphotic variation, one pair of prisms may be rotated through 90° about the optical axis.

18 Claims, 8 Drawing Figures

Kurt KIRCHHOFF
Inventor:

BY Karl J. Ross
Attorney

Kurt KIRCHHOFF

*Inventor:*

BY Karl J. Ross

Attorney

REPRODUCTION CAMERA WITH VARIABLE IMAGE SCALE

My present invention relates to a reproduction camera of the fixed-focus type as used, for example, in photocomposition.

The composing of newspapers, magazines or the like by photographic means often requires a change in image scale, either orthomorphotic (i.e., without distortion) or anamorphotic, to fit different sheet sizes. Thus, for example, standing type such as advertisements may be reproduced alternately on a larger or a smaller printing matrix whose linear dimensions may differ by as much as 7 percent.

The general object of my invention is to provide means in such a camera for selectively altering the image scale, preferably within limits of at least ±7 percent, of an objective consisting essentially of fixed lenses, with maintenance of sharp focusing and high optical quality throughout the range of adjustment.

A more particular object is to provide means in such a camera for optionally switching between anamorphotic and orthomorphotic adjustability.

These objects are realized, in accordance with the present invention, by the interposition of two pairs of complementary prisms between two fixed, spherically effective components, i.e., between one or more front lenses and one or more rear lenses defining a fixed object surface and a fixed image surface in a framework on which these lenses and prisms are mounted within an objective housing. The two prism pairs, disposed in an air space which may also accommodate a diaphragm, are movable under the control of respective setting means for varying the angular position of the prisms of each pair relative to the optical axis of the system. Such pairs of conjugate prisms, designed to vary the magnification ratio of an associated spherically effective objective system, are known per se from my prior U.S. Pat. No. 3,551,029.

In a fixed-focus objective the utilization of such prisms enables the elimination of the heretofore necessary refocusing mechanism which encumbered conventional cameras of this type.

In a simple case, the object and image planes are perpendicular to the optical axis and directly confront the respective lens groups, with illumination of the object surface by a light source mounted on the frame. It may, however, be convenient to insert a reflector in either or both light paths on the object and image sides, with orientation of the corresponding surface parallel rather than perpendicular to the axis.

With the optically effective planes of the two prism pairs mutually perpendicular, adjustment of either pair changes the magnification ratio in a respective dimension to provide an anamorphotic effect; the two setting means, preferably a pair of rotatable rings on the objective housing, may be coupled for joint rotation to vary the image scale in a nondistorting or orthomorphotic manner.

According to another feature of my invention, the two prism pairs may be relatively rotated through 90° about the optical axis, thus into a position in which their optically effective planes coincide; if the two adjoining prisms of the two pairs (which may be separated by the diaphragm) converge codirectionally, i.e., if their major bases lie on the same side of the optical axis, their anamorphotic effects will complement each other so that the magnification ratio in that plane may be extended, e.g. from ±7 to ±14 percent.

Advantageously, pursuant to a further feature of my invention, the two lens groups of the objective are identically symmetrical and define a region of telecentric (i.e., parallel) light rays therebetween. This ensures the maintenance of sharp focusing for all prism positions. Each prism pair may be individually corrected for chromatic aberrations by being composed of six wedges (three per prism) alternately converging in opposite directions, as known per se from my above-identified prior patent, with the outer wedges of each prism having a lower refractive index and a higher dispersion ratio or Abbe number than the inner wedge bracketed thereby.

These and other features of my invention will be described in detail hereinafter with reference to the accompanying drawing in which.

Figure 1:
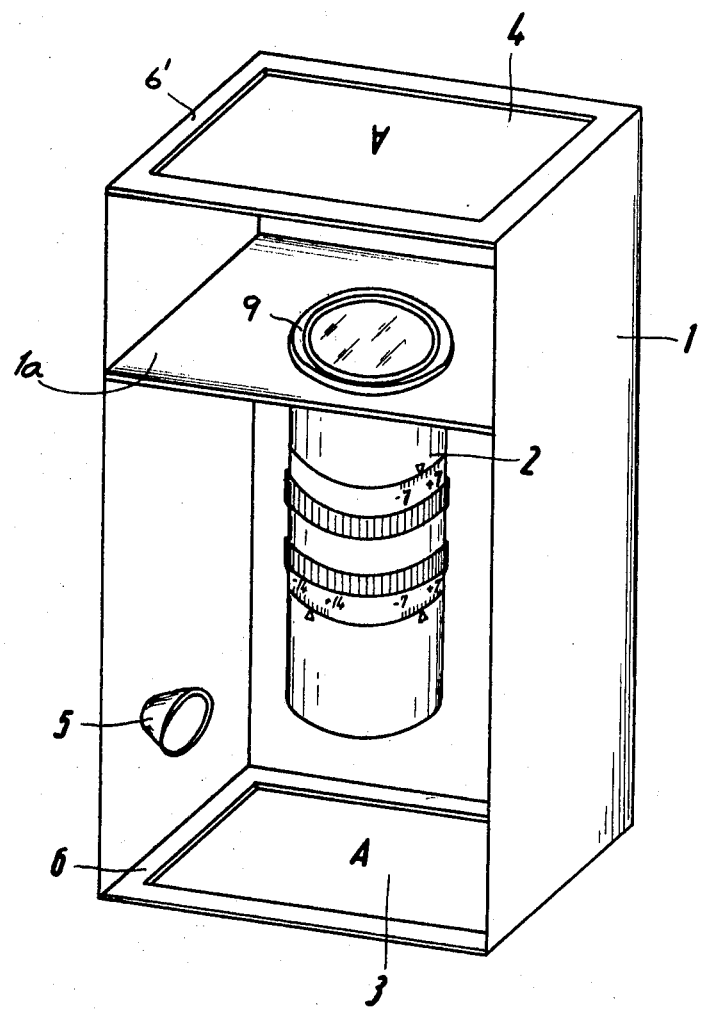
FIG. 1 is a perspective view of a reproduction camera embodying my invention.

In FIG. 1 I have illustrated a fixed-focus reproduction camera having a framework 1 which supports, with the aid of a transverse partition 1a, an objective 2 vertically suspended from that partition, the objective being trained upon an object surface 3 and an image surface 4 on opposite sides of partition 1a. The lower compartment defined by the object surface 3 and the opaque partition 1a contains a light source 5 illuminating a set of type or some other original, symbolized by the letter A, which is to be projected onto a photosensitive film in the upper compartment registering with image surface 4. Mounting frames for the original and the film have been indicated at 6 and 6', respectively.

Figure 2:
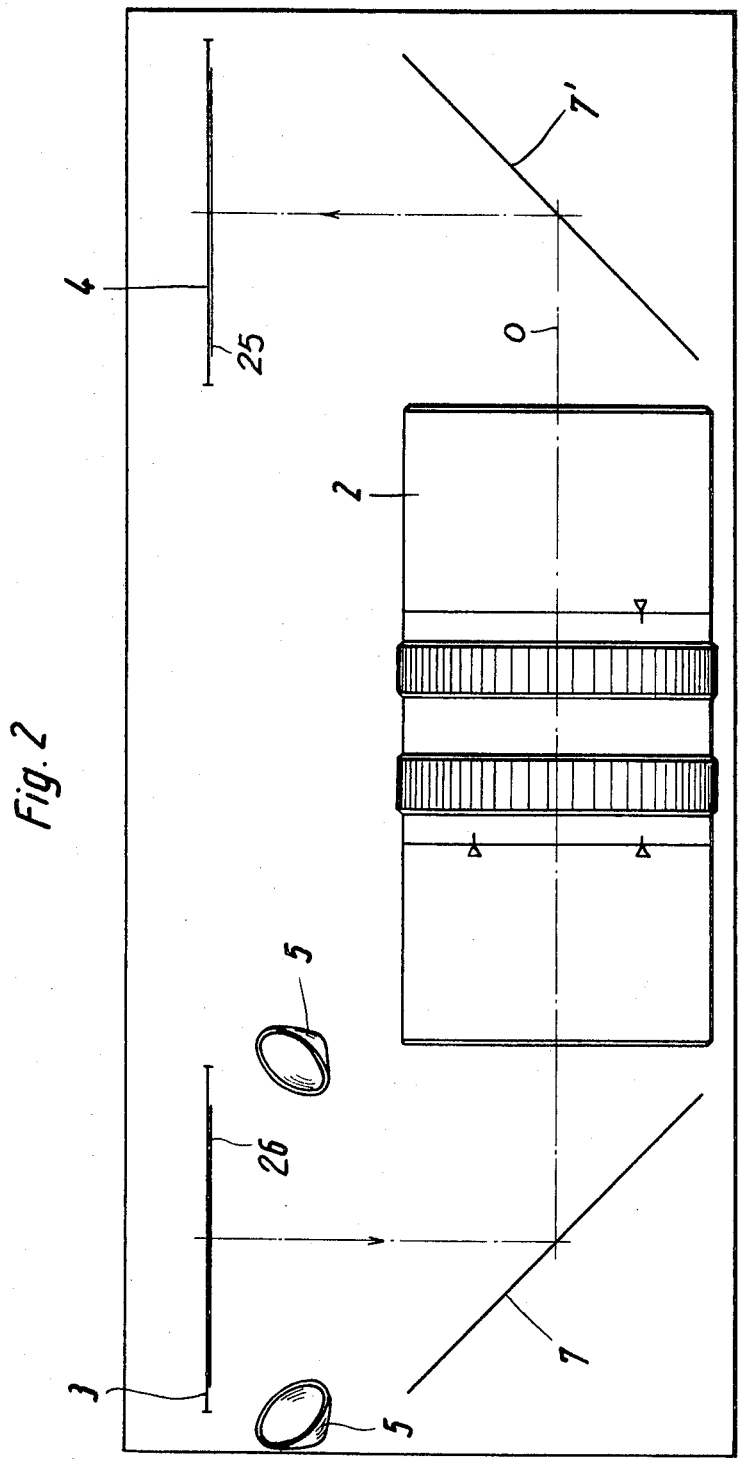
FIG. 2 is a somewhat diagrammatic longitudinal elevation of a modified camera according to the invention.
Figure 3:
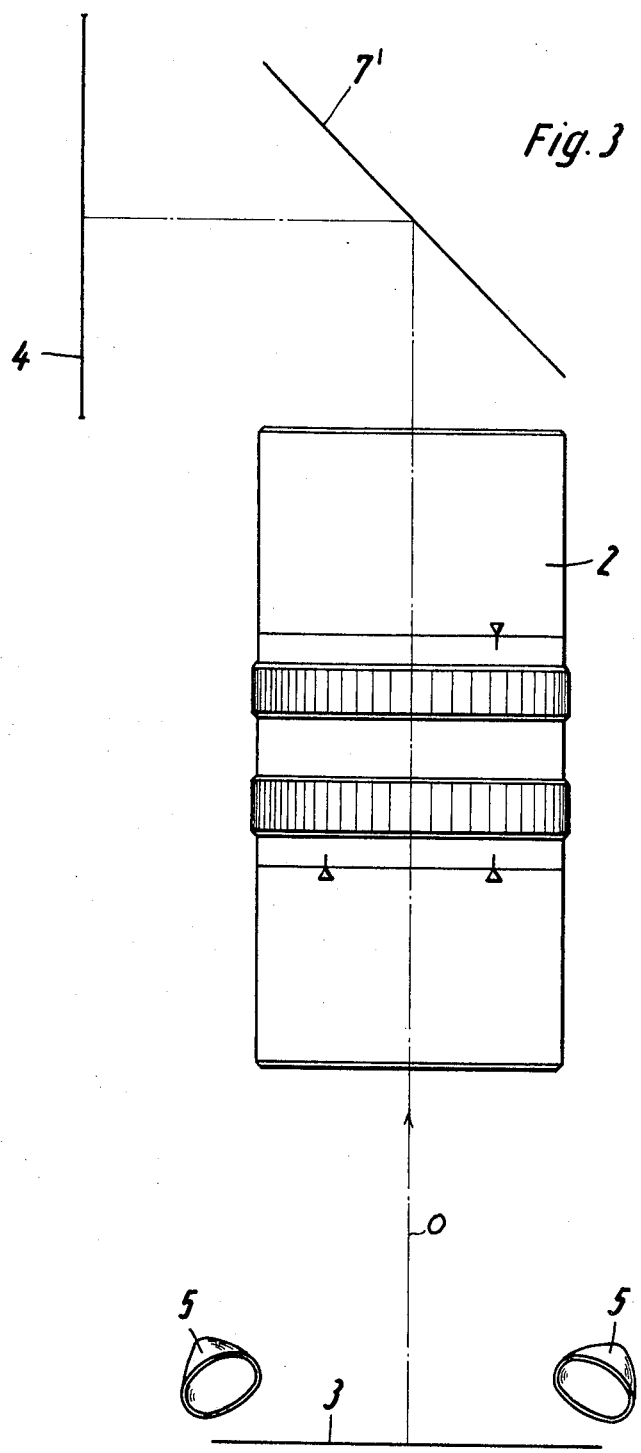
FIG. 3 is a view similar to FIG. 2, showing another modification.
Figure 4:
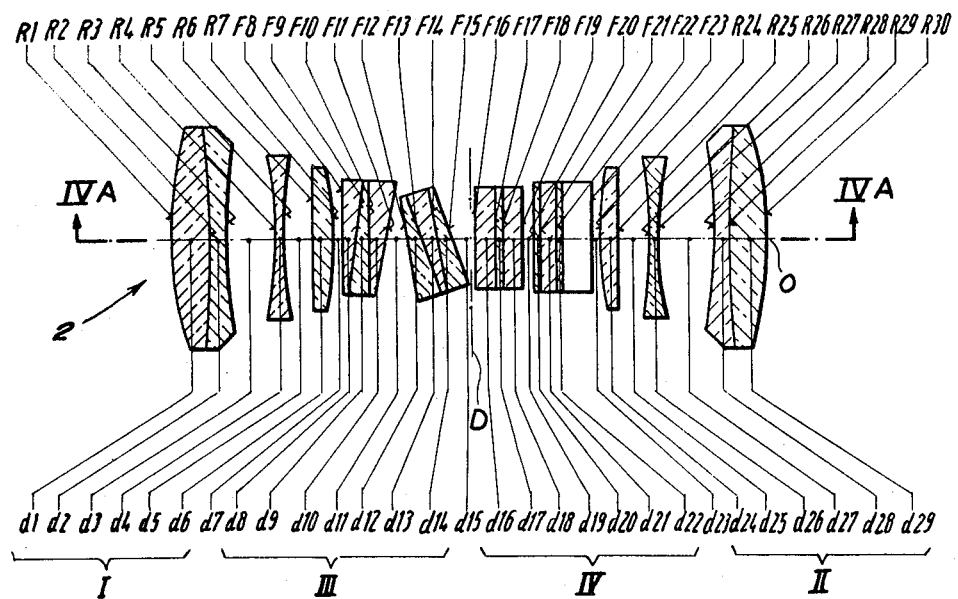
FIG. 4 is a diagrammatic view, in axial section, of the lenses and prisms constituting the objective of the camera shown in FIG. 1.
Figure 4A:
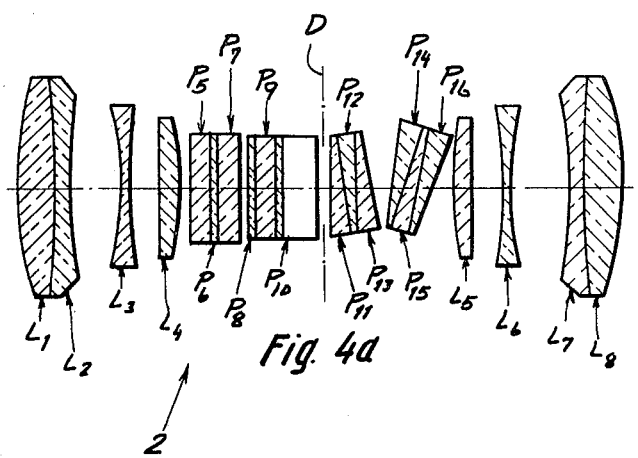
FIG. 4a is a view of the optical system of FIG. 4 in axial section taken on the line IVA — IVA thereof.

As illustrated in FIG. 2, the objective 2 (here shown diagrammatically without its support) is flanked by two reflecting mirrors 7 and 7' directing the light rays from an original or master 26, illuminated by lamps 5, onto a film 25, the master 26 on object surface 3 and the film 25 on image surface 4 being mutually coplanar and parallel to the objective axis 0. According to FIG. 3, the object plane 3 has the same position as in FIG. 1 (perpendicular to axis 0) whereas the image surface 4 is parallel to the axis, with interposition of a reflector 7' in the path of the outgoing light rays.

FIGS. 4, 4a, 5 and 5a show details of the optical elements of the objective 2. A collective front lens group I consists of a meniscus-shaped doublet $L_1$, $L_2$, a biconcave singlet $L_3$ and a nearly planoconvex singlet $L_4$; an identical but reversed lens group II has a positive singlet $L_5$, a negative singlet $L_6$ and a final doublet $L_7$, $L_8$. Interposed between these lens groups are two prism pairs III and IV generally similar to those described in my prior U.S. Pat. No. 3,551,029. The first prism of pair III consists of three wedges $P_5$, $P_6$ and $P_7$, the second prism of that pair being composed of wedges $P_8$, $P_9$, $P_{10}$. The first prism of pair IV consists of wedges $P_{11}$, $P_{12}$ and $P_{13}$, its second prism being composed of wedges $P_{14}$, $P_{15}$ and $P_{16}$. The optically effective planes of the wedges $P_5 - P_{10}$ coincide, in the first position illustrated in FIGS. 4 and 4a, with the plane of the paper in FIG. 4; the effective plane of wedges $P_{11} - P_{16}$ coincides in that position with the plane of the paper in FIG. 4a.

Figure 5:
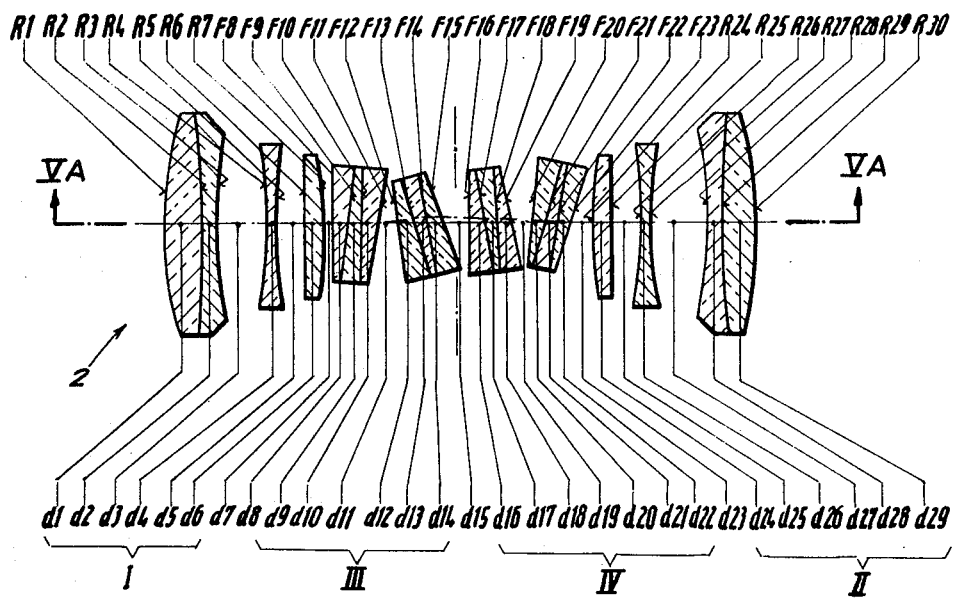
FIG. 5 is a view similar to FIG. 4 but illustrating the system in a different position after relative rotation of its prism pairs through 90°.
Figure 5A:
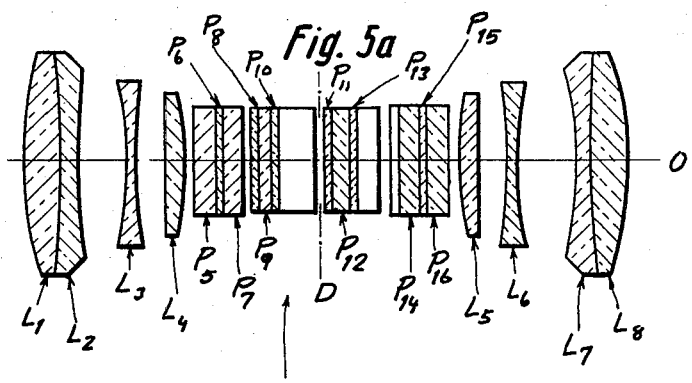
FIG. 5a is a view similar to FIG. 4a taken on the line VA — VA of FIG. 5.

In the second position, illustrated in FIGS. 5 and 5a, the two prism pairs have been relatively rotated through 90° so that the optically effective plane of wedges $P_{11} - P_{16}$ coincides with that of wedges $P_4 - P_{10}$, i.e., with the plane of the paper in FIG. 5.

The two prism pairs are located in an air space d15 accommodating a diaphragm schematically indicated at D. It will be noted that in the coplanar position of the prisms, shown in FIGS. 5 and 5a, the two neighboring prisms $P_8 - P_{10}$ and $P_{11} - P_{13}$ converge codirectionally so as to introduce a cumulative deflection of the light rays traversing same. It will be understood that the relative motions of the prisms of each pair are so correlated that, in any selected position of adjustment, a light ray incident upon the first prism leaves the second prism in a direction parallel to its original direction.

The radii of curvature of lenses $L_1 - L_4$ of group I and $L_{17} - L_{20}$ of group II have been designated R1 – R7 and R24 – R30, respectively; the external and internal prism surfaces of components III and IV have been labeled F8 – F23. The thicknesses and separations of all these optical elements have been indicated at $d1 - d29$.

Figure 6:
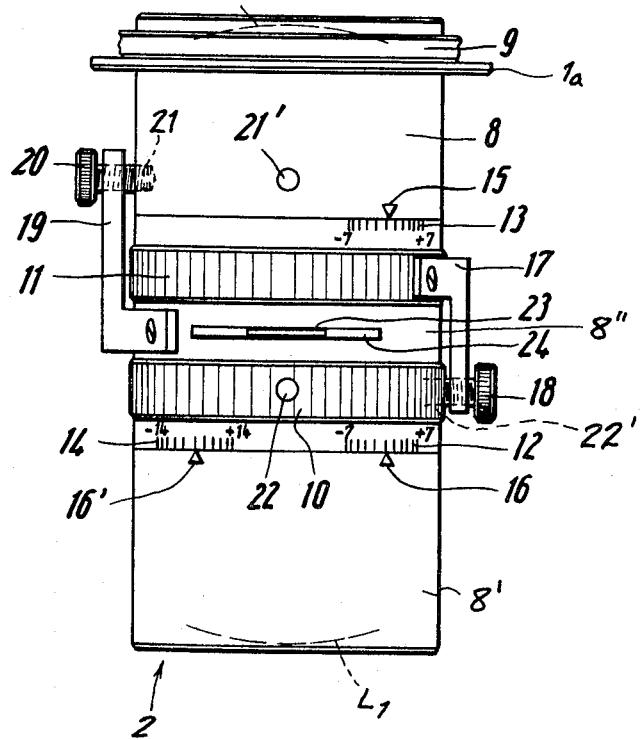
FIG. 6 is an elevational view of the camera objective shown in FIG. 1.

FIG. 6 shows details of the objective 2 which comprises an upper housing portion 8 and a lower housing portion 8', housing portion 8 being secured to partition 1a by an internally threaded mounting ring 9. Lower portion 8' surrounds the front lens group I and the adjacent prism pair III; upper portion 8 accommodates the prism pair IV and the rear lens group II. A setting ring 10 for the prisms of pair III is rotatably disposed on housing portion 8', a similar setting ring 11 for prism pair IV being carried on housing portion 8. These setting rings may be provided with internal camming grooves engaged by rods or the like which are linked to the associated prisms to tilt them in the aforedescribed manner, with a resulting change in magnification ratio in the respective axial plane as read on a pair of scales 12, 13. Scale 12, co-operating with a mark 16 on housing portion 8', indicates (for the orthogonal prism position shown in FIGS. 4 and 4a) the magnification ratio corresponding to a selected position of the setting ring 10 rigid with that scale as determined by the inclination of prisms $P_5 - P_7$ and $P_8 - P_{10}$; scale 13, rigid with setting ring 11, gives the same indication with reference to their conjugate plane as determined by the inclination of prisms $P_{11} - P_{13}$ and $P_{14} - P_{16}$.

A central housing portion 8", integral with lower portion 8', carries an arm 19 into which a screw 20 is threaded. In the position illustrated in FIG. 6, this screw engages in a bore 21 of upper housing portion 8 to maintain the orthogonal prism position of FIGS. 4 and 4a. Upon a retraction of screw 20, housing portions 8' and 8" may be rotated through 90° with reference to housing portion 8 to establish the coplanar prism position of FIGS. 5 and 5a, maintained by introduction of screw 20 into another bore 21'. The central housing portion 8" has a slit 24 giving clearance to an arm 23 for the adjustment of diaphragm D (FIGS. 4 and 5) which is mounted in that part of the housing. In the alternate position just described, the anamorphotic ratio in the common optically effective plane of the two prism pairs is read on a scale 14, rigid with ring 10, against a mark 16' on housing portion 8'; this reading applies to a joint motion of rings 10 and 11, brought about by a mechanical coupling of the two setting rings with the aid of a screw 18 which is carried on an arm 17 rigid with ring 11 and fits into a bore 22 of ring 10. In the orthogonal position actually shown in FIG. 6, screw 18 may engage in another bore 22' of ring 10 if it is desired to adjust both prism pairs concurrently for orthomorphotic image variation.

Advantageously, the four prisms in components III and IV are all identical and individually symmetrical. Listed below are preferred values for the refractive indices $n'$, Abbe numbers $\nu'$ and vertex angles $\alpha'$ of the outer wedges (e.g., $P_5$ and $P_7$) of each prism, made of crown glass, and for the refractive index $n''$, Abbe number $\nu''$ and vertex angle $\alpha''$ of the inner wedge (e.g., $P_6$), made of flint glass, these designations having the same significance as in U.S. Pat. No. 3,551,029:

$n' = 1.62041 \quad \nu' = 60.33 \quad \alpha' = 9.557°$
$n'' = 1.75520 \quad \nu'' = 27.58 \quad \alpha'' = 6.9°$.

In the position illustrated in FIGS. 5 and 5a, in which prism faces F8 and F16 are perpendicular to the optical axis 0, the image is magnified in the optically effective plane in a ratio 1.14 : 1; in that position the inclination of prism surfaces F12 and F20 is such that their surface normals include with the axis 0 an angle of 6.858°.

As will be apparent from FIGS. 4, 4a, 5 and 5a, the objective of the preferred embodiment of my invention is essentially symmetrical about a central transverse plane, i.e., the plane of diaphragm D. Thus, lens groups I and II may have the same parameters, which is advantageous from the viewpoint of mass production, the system then having identical front-focal and backfocal lengths. The prismatic components III and IV lie in a field of parallel light rays if the focal planes of lens groups I and II coincide with the actual or (in the modified systems of FIGS. 2 and 3) virtual positions of object and image surfaces 3 and 4.

Representative numerical values for the parameters of such a symmetrical system, in the specific position of FIGS. 5 and 5a, have been given in the following Table in which the radii R1 – R7 and R24 – R30 as well as the thicknesses and separations $d1 - d29$ (measured along the axis 0) are listed in millimeters; the values appearing next to the designations of the prism surfaces F8 – F23 are the angles of inclination as measured between the surface normals and the axis. Also included in the table are the refractive indices $n_d$ and the Abbe numbers $\nu_d$ of all the lenses and prisms. The distance between the primary and secondary focal planes of this system equals 1,263 mm, which is suitable for the reproduction of copies of 210 × 297 mm. The relative aperture of the objective is 1 : 9.

TABLE

| Radii and Angles | Thicknesses and Separations | $n_d$ | $\nu_d$ | Elements |
|---|---|---|---|---|
| R1 = +116.98 | | | | |
| R2 = −457.00 | $d_1$ = 14.40 | 1.62041 | 60.33 | $L_1$ |
| R3 = +178.00 | $d_2$ = 5.29 | 1.54814 | 45.75 | $L_2$ |
| | $d_3$ = 19.29 Air Space | | | |

| | | | | |
|---|---|---|---|---|
| R4 = −106.20 | | | | |
| R5 = +199.50 | $d_4$ = 2.80 | 1.51742 | 52.20 | $L_3$ |
| | $d_5$ = 11.12 | Air Space | | |
| R6 = +3614.00 | | | | |
| R7 = −103.38 | $d_6$ = 6.40 | 1.62041 | 60.33 | $L_4$ |
| | $d_7$ = 2.00 | Air Space | | |
| F8 = 0° | | | | |
| F9 = +9.557° | $d_8$ = 5.50 | 1.62041 | 60.33 | $P_5$ |
| F10 = +2.657° | $d_9$ = 4.40 | 1.75520 | 27.58 | $P_6$ |
| F11 = +12.214° | $d_{10}$ = 5.50 | 1.62041 | 60.33 | $P_7$ |
| | $d_{11}$ = 7.00 | Air Space | | |
| F12 = −6.858° | | | | |
| F13 = −16.415° | $d_{12}$ = 5.00 | 1.62041 | 60.33 | $P_8$ |
| F14 = −9.515° | $d_{13}$ = 4.30 | 1.75520 | 27.58 | $P_9$ |
| F15 = −19.072° | $d_{14}$ = 5.20 | 1.62041 | 60.33 | $P_{10}$ |
| | $d_{15}$ = 10.60 | Air Space | | |
| F16 = 0° | | | | |
| F17 = −9.557° | $d_{16}$ = 5.20 | 1.62041 | 60.33 | $P_{11}$ |
| F18 = −2.657° | $d_{17}$ = 4.20 | 1.75520 | 27.58 | $P_{12}$ |
| F19 = −12.214° | $d_{18}$ = 5.30 | 1.62041 | 60.33 | $P_{13}$ |
| | $d_{19}$ = 7.10 | Air Space | | |
| F20 = +6.858° | | | | |
| F21 = +16.415° | $d_{20}$ = 4.80 | 1.62041 | 60.33 | $P_{14}$ |
| F22 = +9.515° | $d_{21}$ = 4.80 | 1.75520 | 27.58 | $P_{15}$ |
| F23 = +19.072° | $d_{22}$ = 5.10 | 1.62041 | 60.33 | $P_{16}$ |
| | $d_{23}$ = 9.50 | Air Space | | |
| R24 = +103.38 | | | | |
| R25 = −3614.00 | $d_{24}$ = 6.40 | 1.62041 | 60.33 | $L_{17}$ |
| | $d_{25}$ = 11.12 | Air Space | | |
| R26 = −199.50 | | | | |
| R27 = +106.20 | $d_{26}$ = 2.80 | 1.51742 | 52.20 | $L_{18}$ |
| | $d_{27}$ = 19.29 | Air Space | | |
| R28 = −178.00 | | | | |
| R29 = +457.00 | $d_{28}$ = 5.29 | 1.54814 | 45.74 | $L_{19}$ |
| R30 = −116.98 | $d_{29}$ = 14.40 | 1.62041 | 60.33 | $L_{20}$ |

I claim:

1. A reproduction camera comprising:
spherically effective front lens means centered on an optical axis;
spherically effective rear lens means coaxial with said front lens means and axially separated therefrom by an air space;
an objective housing fixedly supporting said front and rear lens means therein;
a first pair of complementary prisms movable mounted in said housing within said air space and provided with first setting means for varying the angular position of its prisms relative to said axis;
a second pair of complementary prisms movably mounted in said housing within said air space and provided with second setting means for varying the angular position of its prisms relative to said axis;
diaphragm means in said air space between said pairs of prisms; and
frame means fixedly supporting said housing while forming an object surface and an image surface separated from said front and rear lens means by respective ray paths of fixed length.

2. A camera as defined in claim 1 wherein at least one of said ray paths includes a reflector on said frame means.

3. A camera as defined in claim 1, further comprising illuminating means in said frame means trained upon said object surface.

4. A camera as defined in claim 1 wherein said object and image surfaces are so spaced from said front and rear lens means as to produce a field of parallel light rays in said air space.

5. A camera as defined in claim 1 wherein said front and rear lens means are of the same focal length.

6. A camera as defined in claim 5 wherein said front and rear lens means are identical collective lens groups.

7. A camera as defined in claim 1 wherein said pairs of prisms are mounted in said housing with freedom of relative rotation through 90° about said optical axis, said housing being provided with actuating means for so rotating said pairs of prisms between a first position of coincidence of their optically effective planes and a second position in which said planes are mutually perpendicular, adjoining prisms of said pairs converging codirectionally in said first position.

8. A reproduction camera comprising:
spherically effective front lens means centered on an optical axis;
spherically effective rear lens means coaxial with said front lens means and axially separated therefrom by an air space;
an objective housing fixedly supporting said front and rear lens means therein;
a first pair of complementary prisms movably mounted in said housing within said air space and provided with first setting means for varying the angular position of its prisms relative to said axis;
a second pair of complementary prisms movably mounted in said housing within said air space and provided with second setting means for varying the angular position of its prisms relative to said axis, the optically effective planes of said pairs of prisms being mutually perpendicular;
coupling means selectively operable to interconnect said first and second setting means for orthomorphotically varying the image scale of the objective constituted by said lens means and prism pairs; and
frame means fixedly supporting said housing while forming an object surface and an image surface separated from said front and rear lens means by respective ray paths of fixed length.

9. A reproduction camera comprising:
spherically effective front lens means centered on an optical axis;
spherically effective rear lens means coaxial with said front lens means and axially separated therefrom by an air space;
an objective housing fixedly supporting said front and rear lens means therein;
a first pair of complementary prisms movably mounted in said housing within said air space and provided with first setting means for varying the angular position of its prisms relative to said axis;
a second pair of complementary prisms movably mounted in said housing within said air space and provided with second setting means for varying the angular position of its prism relative to said axis, said pairs of prisms being mounted in said housing with freedom of relative rotation through 90° about said optical axis, said housing being provided with actuating means for so rotating said pairs of prisms between a first position of coincidence of their optically effective planes and a second position in which said planes are mutually perpendicular, adjoining prisms of said pairs converging codirectionally in said first position; and
frame means fixedly supporting said housing while forming an object surface and an image surface separated from said front and rear lens means by respective ray paths of fixed length.

10. A camera as defined in claim 9 wherein said first and second setting means are a pair of rings centered on said optical axis.

11. A camera as defined in claim 10 wherein said actuating means comprises a movable portion of said housing carrying one of said rings.

12. A camera as defined in claim 11, further comprising a diaphragm interposed between said pairs of prisms and provided with adjusting means, said movable portion carrying said diaphragm and being provided with a peripheral slot traversed by said adjusting means.

13. A camera as defined in claim 11 wherein said movable portion is provided with indexing means for locking same in either of said positions.

14. A camera as defined in claim 1, further comprising coupling means selectively operable to interconnect said first and second setting means for orthomorphotically varying the image scale of the objective constituted by said lens means and prism pairs, the optically effective planes of said pairs of prisms being mutually perpendicular.

15. A camera as defined in claim 8, further comprising diaphragm means in said air space between said pairs of prisms.

16. A camera as defined in claim 1 wherein said prisms consist each of two outer wedges and an inner wedge converging in opposite directions, said outer wedges having lower refractive indices and higher dispersion ratios than said inner wedges.

17. A camera as defined in claim 16 wherein said prisms are identical, each outer wedge having a vertex angle of substantially 9.6°, said inner wedge having a vertex angle of substantially 6.9°.

18. A camera as defined in claim 17 wherein each outer wedge has a refractive index $n_d$ of substantially 1.62 and a dispersion ratio $v$ of substantially 60, said inner wedge having a refractive index $n_d$ of substantially 1.76 and a dispersion ratio $v$ of substantially 28.

* * * * *